Jan. 26, 1954  R. E. WISSMAN  2,667,248
FRICTION CLUTCH AND BRAKE ON GEARED TYPE PRESSES
Filed Feb. 11, 1950  2 Sheets-Sheet 2
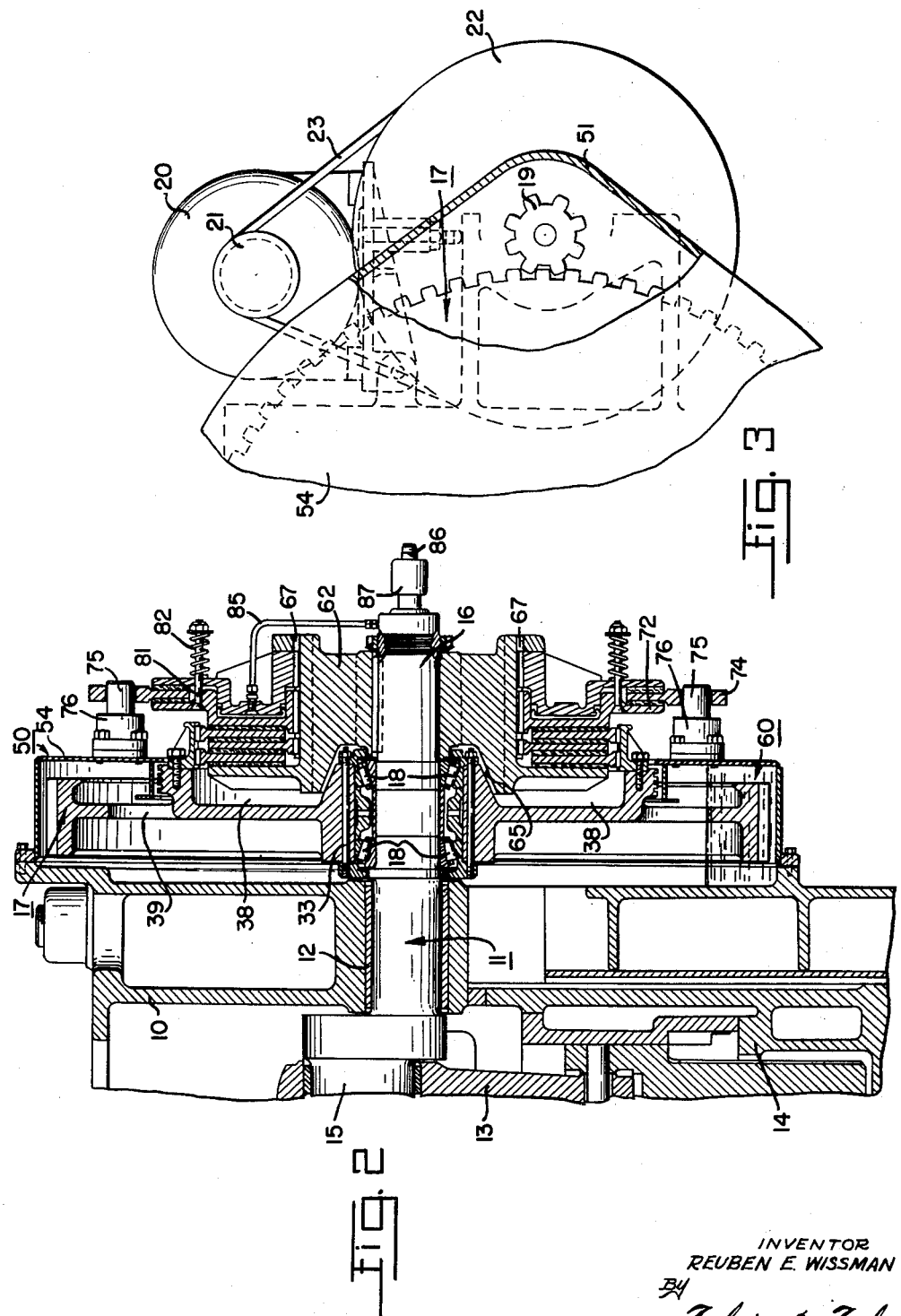
INVENTOR
REUBEN E. WISSMAN
BY
Toulmin & Toulmin
ATTORNEYS.

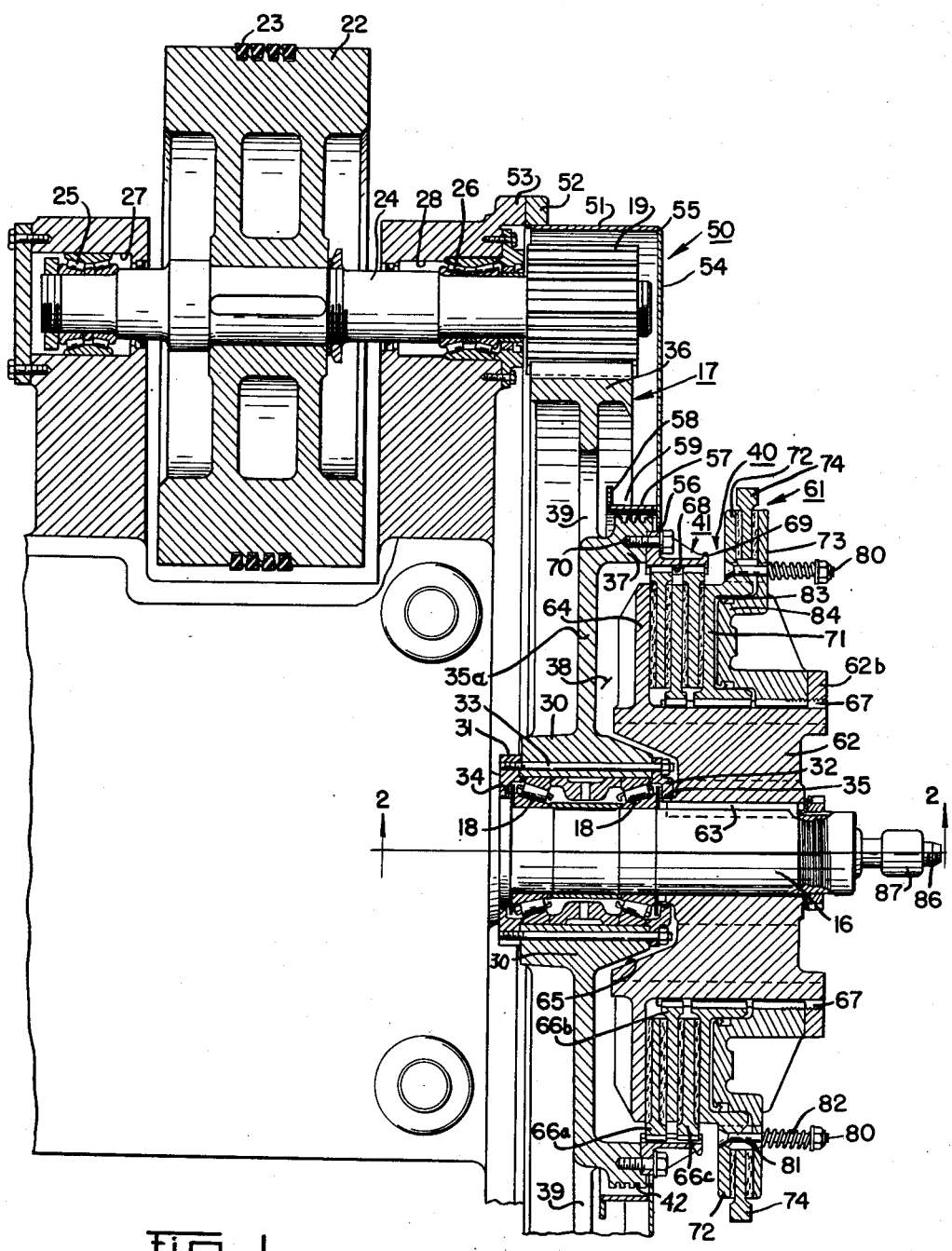

Patented Jan. 26, 1954

2,667,248

UNITED STATES PATENT OFFICE 2,667,248

FRICTION CLUTCH AND BRAKE ON GEARED TYPE PRESSES

Reuben E. Wissman, Minster, Ohio, assignor to The Minster Machine Company, Minster, Ohio, a corporation of Ohio Application February 11, 1950, Serial No. 143,778

2 Claims. (Cl. 192—18)

This invention relates to mechanical presses, and particularly to geared type presses.

An object of the invention is to provide a geared type mechanical press with a combination brake and clutch carried by the main drive gear of the press to reduce the mass that is required to be started and stopped upon operation of the clutch-brake unit.

It is another object of the invention to provide a geared type mechanical press according to the foregoing object wherein the main drive gear rotates continuously during operation of the press, a clutch-brake unit being provided between the main drive gear and the crank shaft of the press so that the clutch-brake unit is required to start and stop only the crank shaft and the mechanism driven thereby and eliminates starting and stopping of the gear mass and the driving mechanism connected therewith, thus providing increased sensitiveness of operation of the clutch-brake unit and the press.

Another object of the invention is to provide a geared type mechanical press in accordance with the foregoing objects wherein the main drive gear is run constantly in an oil bath.

It is still another object of the invention to provide a combination clutch-brake unit carried on the main drive gear of a geared type mechanical press which utilizes the bearing support of the drive gear and eliminates necessity for any outboard bearings for the clutch-brake unit.

It is another object of the invention to provide a combination structure consisting of the main drive gear of a geared type mechanical press, a clutch-brake unit connected with the gear and a housing enclosing the gear, which structure is constructed and arranged such that the gear can run continuously in oil without danger of oil entering the clutch-brake unit to affect operation of the unit.

Still another object of the invention is to provide a geared type mechanical press in which a combination clutch-brake unit is directly connected with the main drive gear of the press to provide for more sensitive control of the torque applied to the crank shaft of the press through the gear.

It is another object of the invention to provide a geared type mechanical press with a combination clutch-brake unit acting directly on the crank shaft of the press and interposed between the crank shaft of the gear to eliminate gear play being transmitted to the crank shaft of the press, and thereby provide for more sensitive control of the crank shaft of the press.

It is another object of the invention to provide a geared type mechanical press in which a combination clutch-brake unit is interposed between the crank shaft and the gear of the press whereby the inertia of the mass of the fly-wheel and gear is maintained relatively constant by continuous operation thereof to obtain a quick pick-up of the crank shaft and avoid energy loss due to starting and stopping of the drive shaft on single stroke operation.

It is another object of the invention to provide a geared type mechanical press with a clutch-brake unit directly connected with the gear of the press with the clutch-brake unit mounted on the outboard side of the gear to provide for ease of assembly and disassembly of the structure.

Still another object of the invention is to provide a geared type mechanical press with a clutch-brake unit mounted on the crank shaft of the press and positioned between the crank shaft and the drive gear of the press so that the drive gear drives the crank shaft only through the clutch-brake unit and wherein the clutch of the clutch-brake unit is adjustable as to the amount of torque transmitted thereby, whereby the clutch can be adjusted to accept a temporary overload in the press by slippage of the clutch to prevent damage to the crank shaft, the press frame or other equipment associated therewith, and in fact can reach a stall condition of the press without damage to the press or equipment.

Further objects and advantages will become apparent from the drawings and the following description.

In the drawings:

Figure 1 is a horizontal cross-sectional view illustrating the apparatus of this invention.

Figure 2 is a vertical cross-sectional view taken along line 2—2 of Figure 1.

Figure 3 is a front elevational view of the apparatus of this invention with the gear housing partially broken away.

The apparatus of this invention is adapted to be utilized on any conventional geared type mechanical press, but is particularly adapted for use on large mechanical presses wherein the increase of life of the clutch-brake unit is most apparent.

The mechanical press consists of a frame 10 of any conventional construction and carries a crank shaft 11 that is suitably journaled in bearings 12 provided in the frame 10. The crank shaft 11 carries a crank 13 that is connected with the platen 14 of the press for moving it through a predetermined stroke governed by the throw of the eccentric 15. The crank shaft 11 has a drive shaft portion 16 thereof projecting from the frame 10 of the press.

The drive shaft portion 16 carries a main drive gear 17 on roller bearings 18. The gear 17 is driven by a pinion 19 that in turn is driven by the electric motor 20 through the pulley 21 and the fly-wheel 22, a plurality of belts 23 extending between the pulley 21 and the flywheel 22.

The fly-wheel 22 is carried upon a shaft 24 that is journaled in roller bearings 25 and 26 supported in bearing housings 27 and 28 of the frame 10. The pinion 19 is carried on the outer end of the shaft 24 and is keyed thereto in any conventional manner.

The gear 17 is provided with a hub 30 which supports the gear on the roller bearings 18. The hub 30 receives the annular flanges 31 and 32 at each side thereof and secured to the hub by means of bolts 33. The flange 31 has the inner-periphery thereof closely adjacent the shaft 16, and is provided with a series of annular grooves 34 which form a lubricant trap to prevent outward seepage of the lubricant from the bearings 18. Similarly, the flange 32 has the inner-periphery closely adjacent the shaft 16 and is provided with a series of grooves 35a which provide a lubricant trap at the opposite end of the bearings 18.

A center web 35a extends between the hub 30 and the gear periphery 36. This web 35a has an annular projection 37 extending from one side thereof thereby forming a recessed chamber 38 within the gear 17 into which the clutch 41 of a clutch-brake unit 40 is adapted to be recessed. Around the annular projection 37 of the web 35a there is provided a plurality of openings 39 to provide a free passage through the web 35a for movement of the lubricant. The annular projection 37 is provided with a series of annular grooves 42 that form a lubricant trap to prevent escape of lubricant over the outer periphery of the projection 37.

The gear 17 and the pinion 19 are enclosed by a housing 50. The housing 50 consists of a relatively annular ring 51 to which there is attached a relatively annular ring 52 by which the housing is attached to a relatively annular projection 53 on the frame 10 to coincide with the relatively annular ring 52 to provide a fluid tight joint therebetween. A plate 54 is secured to the relatively annular ring 51 as by welding at the edges 55, which plate has a central opening 56 adjacent the annular projection 37 on the gear 17, and of smaller size than the diameter of the outer periphery of the projection 37, to receive a part of the clutch-brake unit 40.

The annular ring 57 is suitably welded to the plate 54 on the inner face thereof and is positioned closely adjacent the outer periphery of the projection 37 on the gear 17 and adjacent the lubricant grooves 42 therein. The annular ring 57 has a lip 58 thereon, thereby providing a trough 59 positioned around the projection 37.

A suitable amount of lubricant 60 such as oil of a selected grade is placed in the housing 50 to a level such as that indicated in Figure 2, the oil remaining in the lower part of the housing 50.

Rotation of the gear 17 by the pinion 19 will cause the gear to dip continuously into the reservoir of oil 60 and thereby carry the oil to the pinion 19 so that the pinion and gear are continuously lubricated. This arrangement avoids the usual practice of periodically brushing lubricant on the pinion and gear.

Alternately, oil can be pumped over the top of gear 17. The oil will then drain from the bottom of the housing 50 through a suitable opening for recirculation over the gear 17.

The trough 59 will catch lubricant draining from the upper portion of the gear 17 and conduct it into the oil reservoir at the bottom of the housing 50. The passages 39 in the web 35 prevent trapping of lubricant between the gear 17 and the frame 10 of the press. The grooves 42 provide a lubricant trap to prevent lubricant from creeping over the surface of the projection 37 and discharging onto the face of the gear 17, and over the clutch-brake unit 40.

The clutch-brake unit 40 consists of the clutch 41 previously referred to and a brake 61.

The clutch-brake unit 40 consists of a hub 62 that is supported on the shaft 16 and rotatably driven therewith through the key 63. The hub 62 has a radially extending plate 64 that forms the braking plate of the clutch-brake unit. The hub 62 is provided with a recess chamber 65 that receives a part of the hub 30 of the gear 17 to provide for close coupling of the gear 17 and the clutch-brake unit 40 to reduce to a minimum the overhang of the shaft 16 from the frame 10 of the press.

A plurality of clutch plates 66a, 66b and 66c extend between the hub 62 of the clutch-brake unit 40 and the projection 37 of the gear 17. The plate 62b is carried on the splined periphery 67 of the hub 62 for axial movement on the hub. The clutch plates 66a and 66c are carried within the splined inner-periphery 68 of a ring 69 that is secured to the projection 37 of the gear 17 by means of bolts 70. The plates 66a, 66b and 66c thus provide for a driving connection between the gear 17 and the shaft 16 when in full engagement.

A plate 71 is also splined on the outer periphery 67 of the hub 62 and provides the actuating plate for the clutch plates 66a, 66b and 66c upon movement of the plate 71 in a leftward direction as viewed in Figures 1 and 2. The plate 71 has an annular flange extension 72 which forms the actuating plate of the brake 61.

The brake 61 consists of the actuating plate 72 and a backing plate 73 which is also carried on the splined outer periphery 67 of the hub 62 so that the plates 72 and 73 rotate with the hub 62. A stationary brake plate 74 is positioned between the plates 72 and 73. This stationary plate 74 is carried on pins 75 that project from supports 76 secured to the front face of the plate 54 of the housing 50.

A spring actuator 80 for the brake 61 extends between the plates 72 and 73 and consists of the pin 81 and the spring 82 which is held under compression to normally urge the actuating plate 72 against the stationary plate 74 for engagement of the brake.

Disengagement of the brake 61 and engagement of the clutch 41 is produced by fluid pressure that is introduced into the chamber 83 which is annularly arranged in the plate 72 forming a cylinder which operates over the annular piston 84.

An air pressure control valve, not shown, is placed in the air pressure line 86 to control the air pressure supplied into the chamber 83. The air pressure in the chamber 83 is the governing factor in controlling the degree of frictional engagement between the clutch plates of the clutch 41 and thus the torque that will be transmitted through the clutch before the plates can slip relative to one another.

The control of the air pressure in chamber 83 provides means by which an overload in the press can be absorbed by the clutch and thereby eliminate damage to the press, the dies and the driving mechanism of the press. If for any reason the crank shaft of the press cannot make a full rotation because of an obstruction in the press preventing the platen 14 from making its full stroke, a maximum torque will be reached that will be transmitted by the clutch 41 whereafter the clutch plates will slip and prevent damage to any of the press mechanism. The maximum torque that the clutch 41 will transmit from the drive gear 36 to the crank shaft 16 is regulatable by control of the air pressure in the chamber 83 from a high point of the maximum capacity of the clutch to a minimum point at which very light torque is transmitted by the clutch, depending on whether the air pressure in the chamber 83 is of a high value, or a low value.

It will be apparent that with the clutch-brake unit 40 carried directly on the drive shaft 16 of the press that more sensitive operation of the drive shaft can be obtained, and that all gear play between the power source and the drive shaft will be eliminated insofar as its direct transmission to the drive shaft 16 is concerned since the play is between the clutch and the power source and will not affect the drive shaft 16. Also, with the clutch 41 interposed between the drive shaft 16 and the gear 17, the power source and the gear operate continuously so that the maximum inertia of these masses is available at all times to pick up the press for a rapid start, and that it is not necessary to stop large masses having high inertia, thereby increasing the life of the clutch-brake unit.

While the apparatus disclosed and described herein illustrates a preferred form of the invention, yet it will be understood that various mechanical alterations can be made without departing from the spirit of the invention, and that all modifications that fall within the scope of the appended claims are intended to be included herein.

Having thus fully described my invention, what I claim as new and desire to secure by Letters Patent is:

1. The combination of a geared type of press having a crankshaft projecting from the press frame and carrying a drive gear thereon adjacent the press frame and a combination clutch-brake unit on the outboard end of the crankshaft, said drive gear including a first gear hub journaled on said shaft for free rotation thereon, a second hub on the outboard end of said shaft drivingly secured thereto; said second hub exteriorly overlapping a part of said gear hub to nest therewith, a center web extending outwardly from said first hub, an annular projection extending from one side of said web and formed therewith, a recessed chamber around said gear hub, said chamber receiving a portion of said combination clutch-brake unit, housing means surrounding said gear and being secured to said press, said housing having a wall provided with a central opening for reception of said clutch-brake unit, said wall overlapping and terminating adjacent said projection whereby a portion of said projection is within said housing, fluid lubricant means within said housing and annular grooves located in said projection for preventing lubricant from escaping from said housing.

2. The combination of a geared type of press having a crankshaft projecting from the press frame and carrying a drive gear thereon adjacent the press frame and a combination clutch-brake unit on the outboard end of the crankshaft, said drive gear including a first gear hub journaled on said shaft for free rotation thereon, a second hub on the outboard end of said shaft drivingly secured thereto; and said second hub exteriorly overlapping a part of said gear hub to nest therewith, a center web extending outwardly from said first hub, an annular projection extending from one side of said web and formed therewith, a recessed chamber around said gear hub, said chamber receiving a portion of said combination clutch-brake unit, housing means surrounding said gear and being secured to said press, said housing having a wall provided with a central opening for reception of said clutch-brake unit, said wall overlapping and terminating adjacent said projection whereby a portion of said projection is within said housing, fluid lubricant means within said housing, annular grooves located in said projection for preventing lubricant from escaping from said housing and lubricant drainage means within said housing comprising an annular trough secured to said wall adjacent said opening and in concentric relationship with said projection, said trough acting as a means for draining lubricant.

REUBEN E. WISSMAN.

References Cited in the file of this patent

UNITED STATES PATENTS

| Number | Name | Date |
|---|---|---|
| 1,474,112 | Groene | Nov. 13, 1923 |
| 2,009,301 | Rode et al. | July 23, 1935 |
| 2,065,820 | Mellon | Dec. 29, 1936 |
| 2,120,798 | Criley | June 14, 1938 |
| 2,180,218 | Wissman | Nov. 14, 1939 |
| 2,286,943 | Verson et al. | June 16, 1942 |
| 2,302,838 | Bundy | Nov. 24, 1942 |
| 2,313,187 | Williamson | Mar. 9, 1943 |
| 2,402,052 | Johansen | June 11, 1946 |
| 2,472,452 | Wissman | June 7, 1949 |